US010151574B2

(12) United States Patent
Conley et al.

(10) Patent No.: US 10,151,574 B2
(45) Date of Patent: Dec. 11, 2018

(54) PRECISION SURFACE MEASUREMENT IN A VACUUM

(71) Applicant: UCHICAGO ARGONNE, LLC, Chicago, IL (US)

(72) Inventors: Raymond P. Conley, Mokena, IL (US); Jun Qian, Lemont, IL (US); Mark J. Erdmann, Darien, IL (US); Elina Kasman, Buffalo Grove, IL (US); Lahsen Assoufid, Chicago, IL (US); Scott J. Izzo, Wheeling, IL (US)

(73) Assignee: UChicago Argonne, LLC, Chicago, IL (US)

( * ) Notice: Subject to any disclaimer, the term of this patent is extended or adjusted under 35 U.S.C. 154(b) by 0 days.

(21) Appl. No.: 15/648,154

(22) Filed: Jul. 12, 2017

(65) Prior Publication Data

US 2018/0017372 A1    Jan. 18, 2018

Related U.S. Application Data

(60) Provisional application No. 62/361,424, filed on Jul. 12, 2016.

(51) Int. Cl.
*G01B 9/02* (2006.01)
*G01B 11/24* (2006.01)

(52) U.S. Cl.
CPC ....... *G01B 9/0209* (2013.01); *G01B 9/02002* (2013.01); *G01B 9/02022* (2013.01); *G01B 9/02057* (2013.01); *G01B 9/02062* (2013.01); *G01B 9/02091* (2013.01); *G01B 11/2441* (2013.01); *G01B 2290/45* (2013.01)

(58) Field of Classification Search
CPC ............ G01B 11/2441; G01B 9/02049; G01B 9/02057; G01B 9/0209
See application file for complete search history.

(56) References Cited

U.S. PATENT DOCUMENTS

2013/0188162 A1*  7/2013  Gerhard .............. G03F 7/70266
355/67

OTHER PUBLICATIONS

Wyant, J.C., et al., "Testing Flat Surface Optical Components," Applied Optics, vol. 13, Jul. 1974, pp. 1-40.
Kudo, et al., "Three-dimensional surface figure measurement of high-accuracy spherical mirror with nanoprofiler using normal vector tracing method," Review of Scientific Instruments 85, 045101 (2014).
Murphy, et al.,. "High precision metrology of domes and aspheric optics," Proceedings of the SPIE 5786, pp. 112-121 (2005).
Wyatt, "Introduction to Interferometric Optical Testing," University of Arizona College of Optical Sciences, 109 pages (2016).

* cited by examiner

*Primary Examiner* — Jonathan Hansen
(74) *Attorney, Agent, or Firm* — Foley & Lardner LLP

(57) ABSTRACT

Methods and related equipment for dynamic on-axis in-situ interferometry where the reference surface is positioned in an vacuum chamber. The systems use a wavelength shifting, or a phase shifting interferometer that allows the freedom to eliminate the need to step the cavity length physically with the reference surface, allowing the reference surface to be placed inside the vacuum chamber.

15 Claims, 16 Drawing Sheets

PRECISION SURFACE MEASUREMENT IN A VACUUM

CROSS REFERENCE TO RELATED APPLICATION

The present application claims the benefit of priority to U.S. Provisional Patent Application No. 62/361,424 filed Jul. 12, 2016, which is incorporated herein by reference in its entirety.

STATEMENT OF GOVERNMENT INTEREST

The United States Government claims certain rights in this application pursuant to Contract No. W-31-109-ENG-38 between the United States Government and the University of Chicago and/or pursuant to DE-AC02-06CH11357 between the United States Government and UChicago Argonne, LLC representing Argonne National Laboratory.

TECHNICAL FIELD

The present disclosure relates generally to systems and methods involving interferometry, metrology and vacuum testing.

BACKGROUND

The surface figure shape and precision of optics directly impacts their performance. Synchrotrons, high-energy density laser systems, EUV lithography equipment, and astronomy instrumentation are all limited in some way by the quality of available optics. State of the art mirror figuring techniques include ion-beam figuring, elastic-emission machining, deterministic polishing, and magnetorheological finishing. All of these systems operate in an iterative fashion whereby mirrors are measured off-line in order to generate a correction map, and then the figures are corrected with the preferred technique. This process is repeated multiple times until the mirror shape is within the required error budget.

While the surface figuring technique can be fast, throughput is universally limited by the steps involved with transferring between the processing setup and the measurement setup. Furthermore, most industrial applications physically separate their "open-air" metrology stations from the surface figuring instruments.

For any of the figure correction techniques, and in particular for ion-beam figuring, significant dwell time is needed for the processed optic to adjust to new ambient conditions when switching between processing and metrology. Figuring performance can also be affected by switching between two separate processing and metrology stations because registration errors between the two steps can accumulate; this is even more prolific when fiducial markings cannot be used and the mirror edges are ambiguous.

Fizeau interferometers are one device used for such measurement applications. However, current interferometers suffer from several deficiencies. In a typical Fizeau interferometry application, a reference surface (transmission surface) serves as the reference flat. An optical wavefront passes through this transmission flat in order to reflect off of the surface under test ("SUT"). This reflected wavefront is collected by the interferometer and processed in order to produce a surface map that is used for figure correction. This is called a two-surface cavity measurement.

Insertion of extra optical surfaces into the measurement system (such as a vacuum window) will create aberrations to this wavefront. Added aberrations due to re-trace error can be induced if an off-axis interferometer design is used. Furthermore, the reference flat requires precision tip and tilt adjustment and must be rotated in order to perform the most rigorous reference flat error subtraction, called a "three-surface test".

Another issue that has been found in certain cases to cause measurement instability is ambient humidity. The hygroscopic nature of antireflection coatings on transmission flats creates surface film stress that fluctuates with humidity, adding curvature to the flat.

SUMMARY

Methods and related equipment for dynamic on-axis interferometry and performing metrology testing through a simulated and actual vacuum window/transmission flat. In addition, a mechanical design for inclusion of a three-surface test under vacuum for subtraction of optical path aberrations in interferometry measurements.

One embodiments relates to an interferometer system comprising: a wavelength shifting on-axis interferometer; a vacuum chamber optically coupled to the interferometer; the vacuum chamber having a vacuum chamber window separating the vacuum chamber from the interferometer; and a reference surface positioned in the vacuum chamber between the vacuum chamber window and a surface under testing.

Another embodiment relates to an interferometer system comprising: a wavelength shifting on-axis interferometer coupled to a vacuum chamber; the vacuum chamber having a vacuum chamber window separating the vacuum chamber from the interferometer; and a reference surface positioned in the vacuum chamber; a fabrication system having a surface under test, the deposition system coupled to the vacuum chamber and the reference surface positioned between the vacuum chamber window and the surface under testing.

Yet another embodiment relates to a method of surface figuring comprising: performing on-axis interferometry on a surface under testing located in a vacuum chamber wherein a reference flat is positioned between a vacuum chamber window of the vacuum chamber and the surface under testing.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

DETAILED DESCRIPTION OF VARIOUS EMBODIMENTS

One embodiment relates to systems and methods for interferometry and metrology. Specifically, systems and methods are provided for dynamic on-axis interferometry and performance of metrology testing. The systems and methods have been tested through a simulated and actual vacuum window/transmission flat as described herein. Another aspect relates to the ability to provide a three-surface test under vacuum for subtraction of optical path aberrations in interferometry measurements.

Figure 1A:
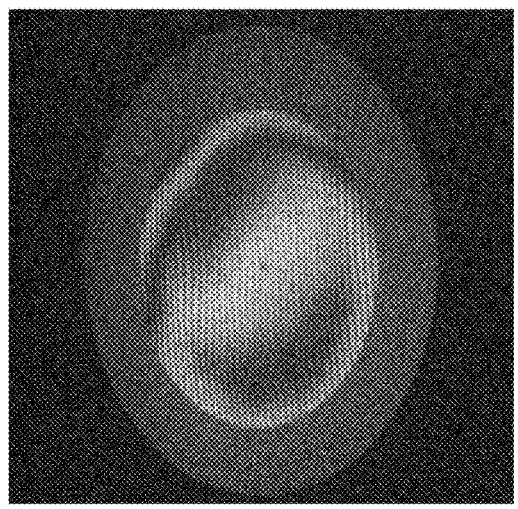
FIG. 1A illustrates the Optical Path Deflection of a Vacuum Chamber Window under no vacuum and FIG. 1B illustrates the variance of the surface.
Figure 1B:
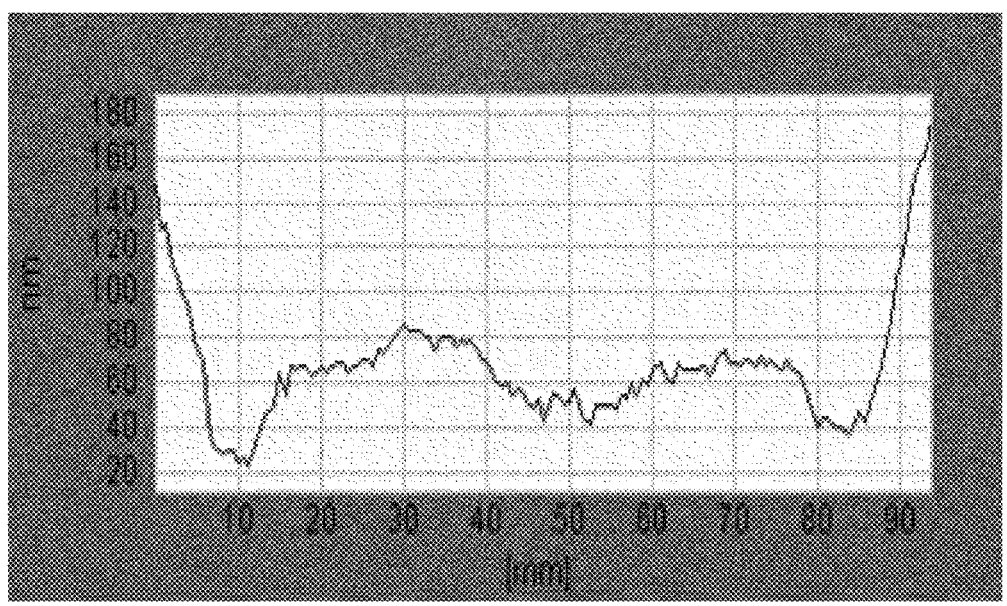
Figure 1C:
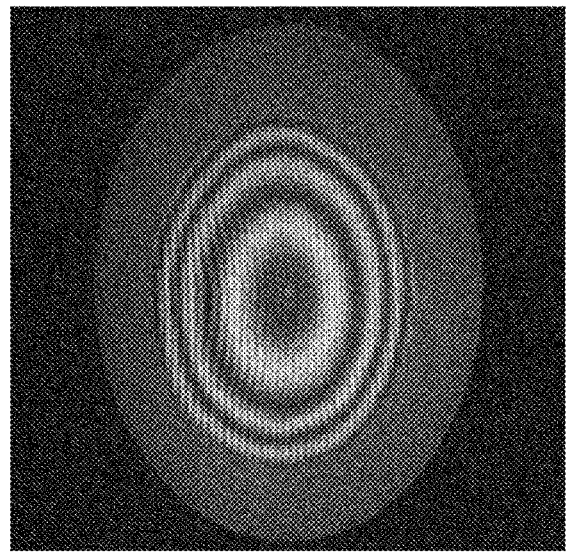
FIG. 1C illustrates the Optical Path Deflection of a Vacuum Chamber Window under a low vacuum and FIG. 1D illustrates the variance of the surface. This is equivalent to having no pressure differential in 1A and 1B, and having 15 PSI or roughly 1000 hPa of pressure differential in 1B and 1D.
Figure 1D:
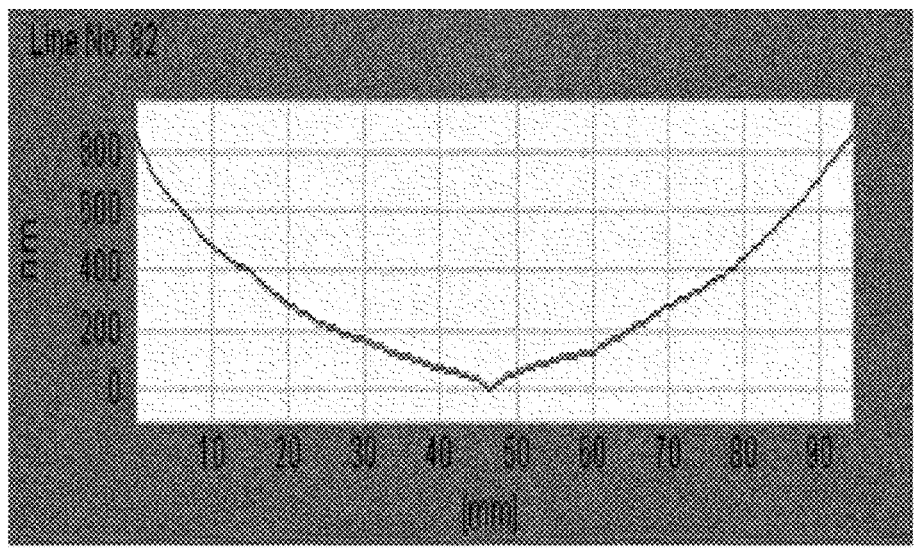
Figure 2A:
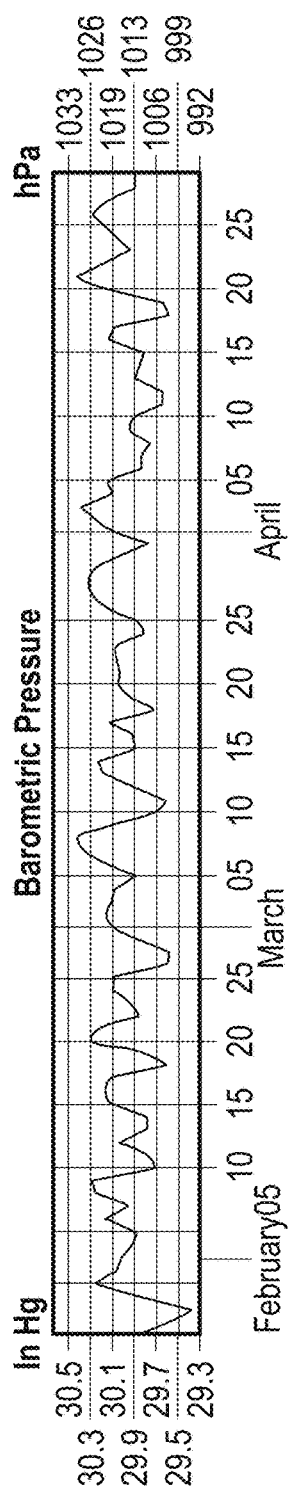
FIG. 2A illustrates the variability of barometric pressure due to atmospheric natural variations over 1 month. Resultant OPD impact on the VCW will be proportional to this variability.
Figure 2B:
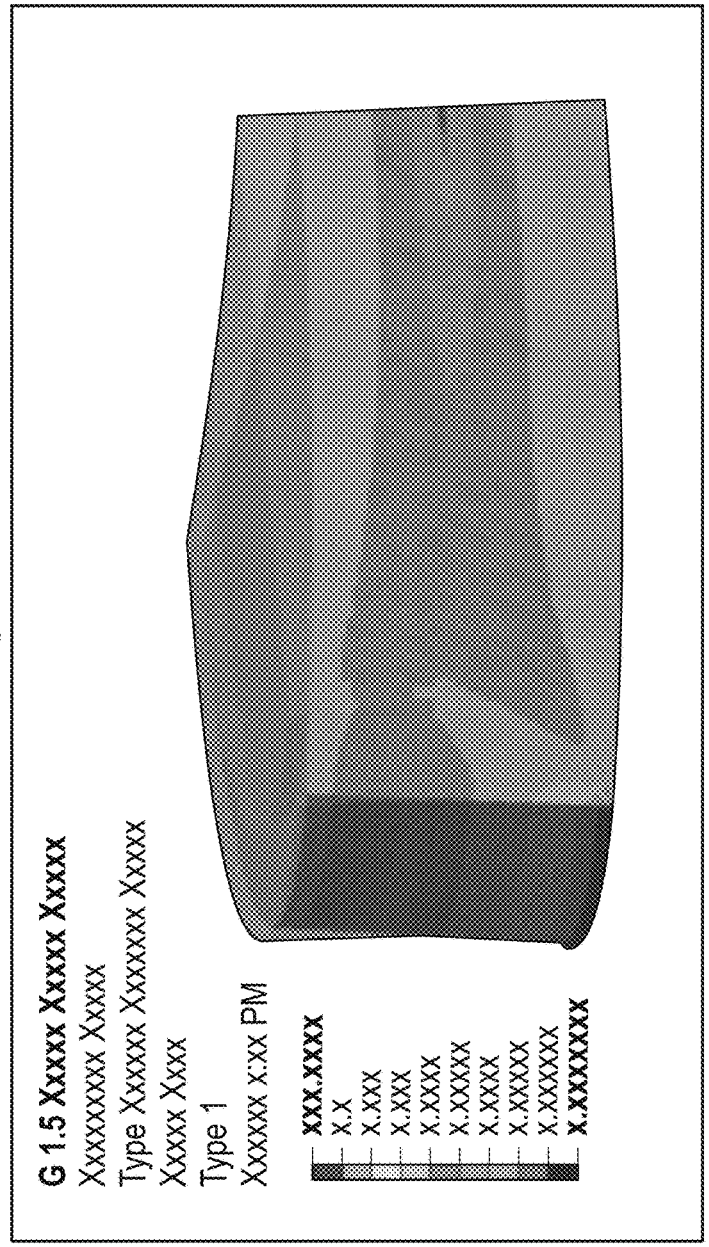
FIG. 2B illustrates stress impact on a 1.5 inch thick, 6" diameter fused quartz optical viewport with 1 atmosphere of pressure differential.

One issue with the use of vacuum chambers for interferometry study is the optical path deflection of the vacuum chamber's window when under pressure. This deflection, $W_{max}$ can be represented as:

$$W_{max} = \frac{3}{16} \frac{p}{E(1-v^2)} \frac{R^4}{t^3}$$

Where p is pressure, R is the window radius, t is the window thickness, E is Young's modulus, and v is Poisson's ratio. For example, vacuum chamber windows have been obvserved at APS to change from 33 km (at atmosphere, i.e. without vacuum) to 1.46 km (low vacuum) based on different pressure environments. The variance in the curvature of the optics is problematic for most applications. FIG. 1A illustrates an interferogram of an optical path deflection of a vacuum chamber window without vacuum applied. FIG. 2B illustrates the same setup as FIG. 1A but with a low vacuum applied. As can be seen in the differences between the two interferograms, the vacuum results in a deflection of the vacuum chamber window, which adversely impacts the optical path for the setup.

In addition to the physical impact due to the vacuum, other environmental factors are known to impact interferometry measurement. For example, barometric pressure. FIG. 2A illustrates the variability of barometric pressure. FIG. 2B illustrates the pressures exerted on the viewport. The table below indicates the relation of the pressure and thickness of the viewport to the radius of curvature.

TABLE 1

|  | 0.25" | 0.5" |
| --- | --- | --- |
| 772.16 Torr | 63.2 m | 1597 m |
| 744.22 Torr | 60.9 m | 1660 m |

Figure 3A:
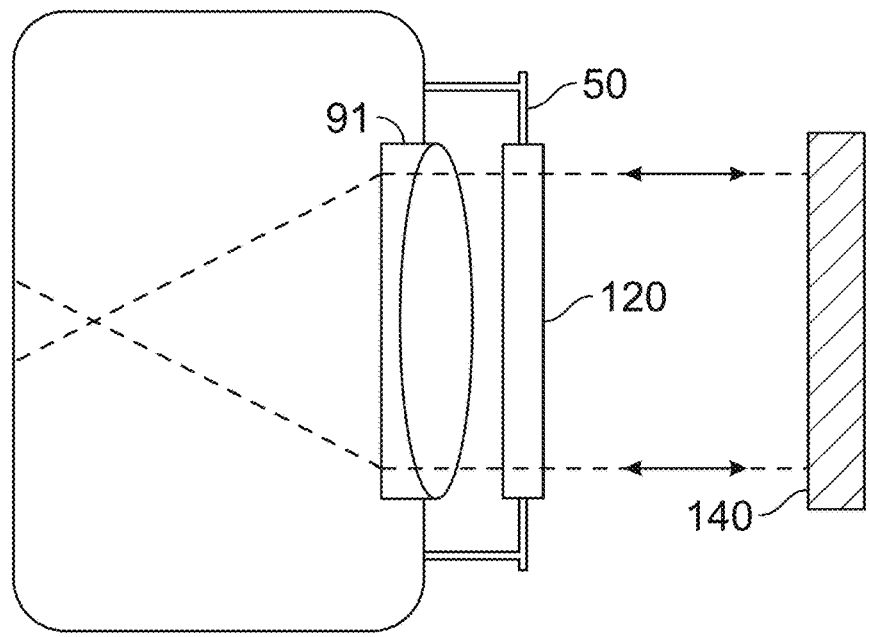
FIG. 3A is a cross-sectional illustration of mechanically-tuned interferometer for measurement of the SUT.
Figure 3B:
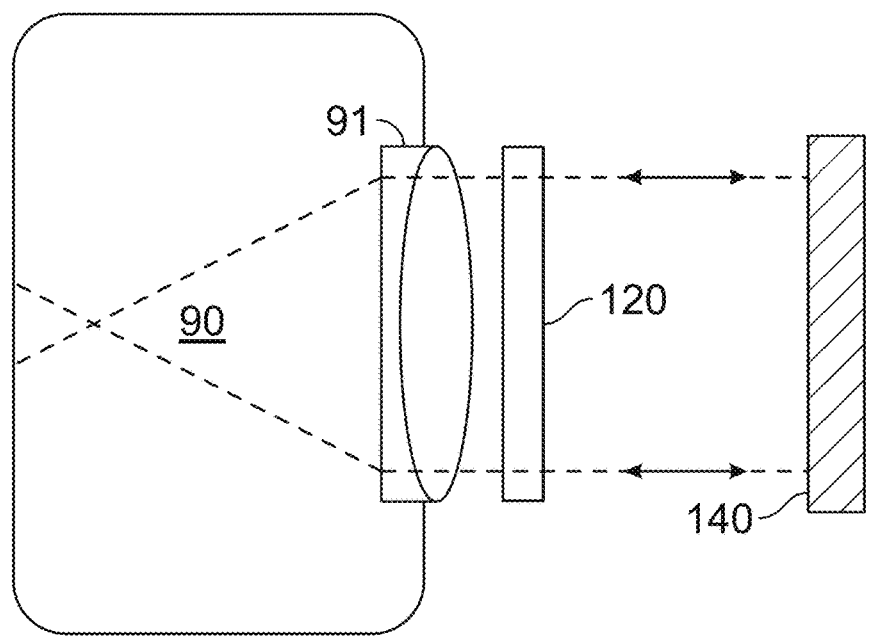
FIG. 3B is a cross-sectional illustration of wavelength tuned interferometer for measurement of the SUT.
Figure 4A:
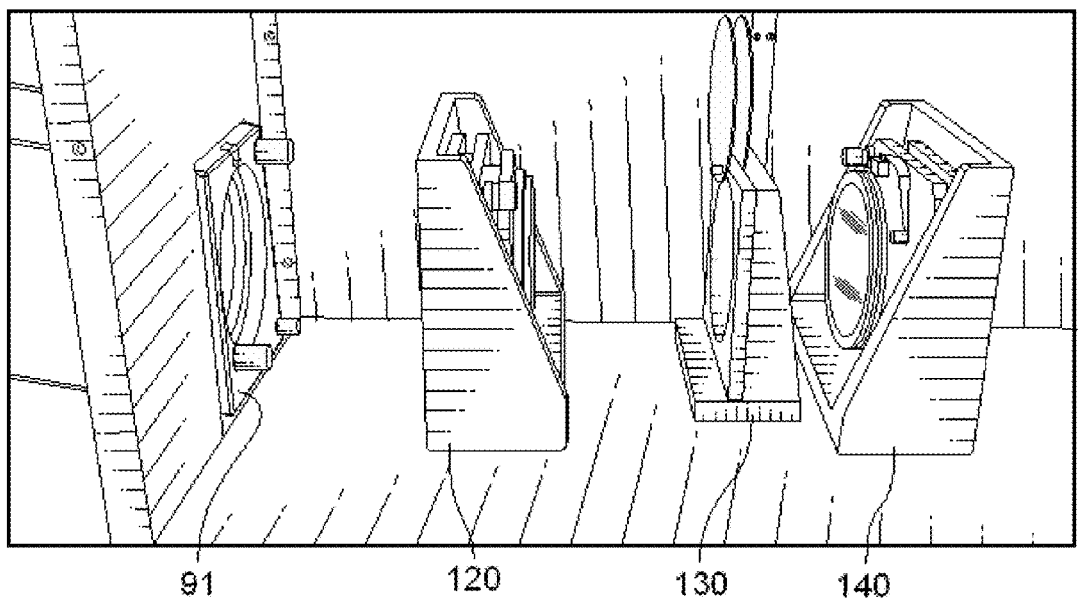
FIG. 4A illustrates a simplified structure of a mirror figure measurement system with an interferometer.
Figure 5A:
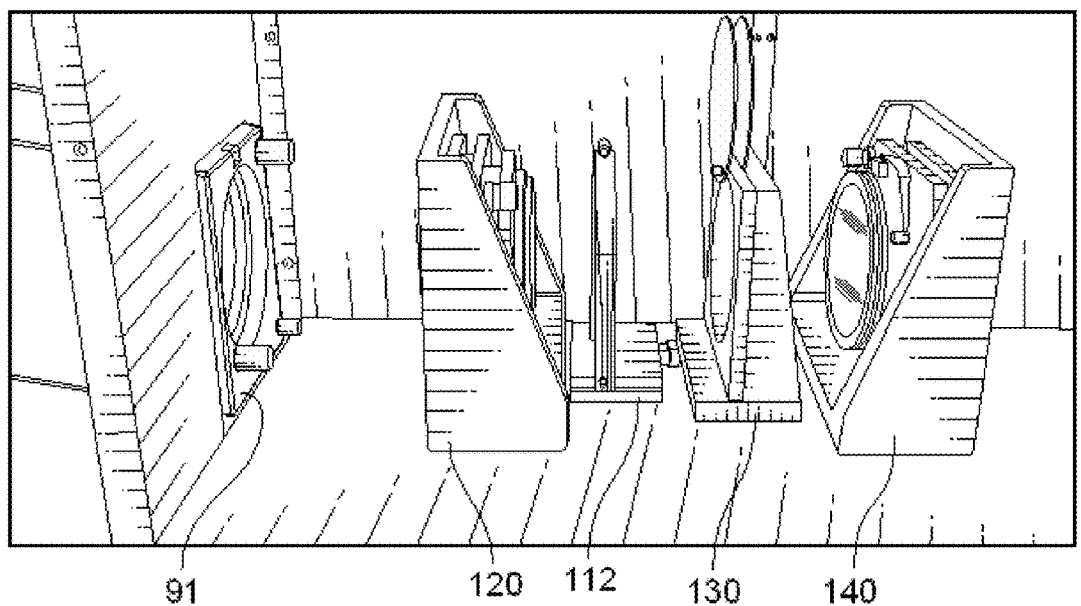
FIG. 5A is a photograph of a the same setup in 4A but with a vacuum window inserted in between the transmission flat and the SUT.
Figure 6A:
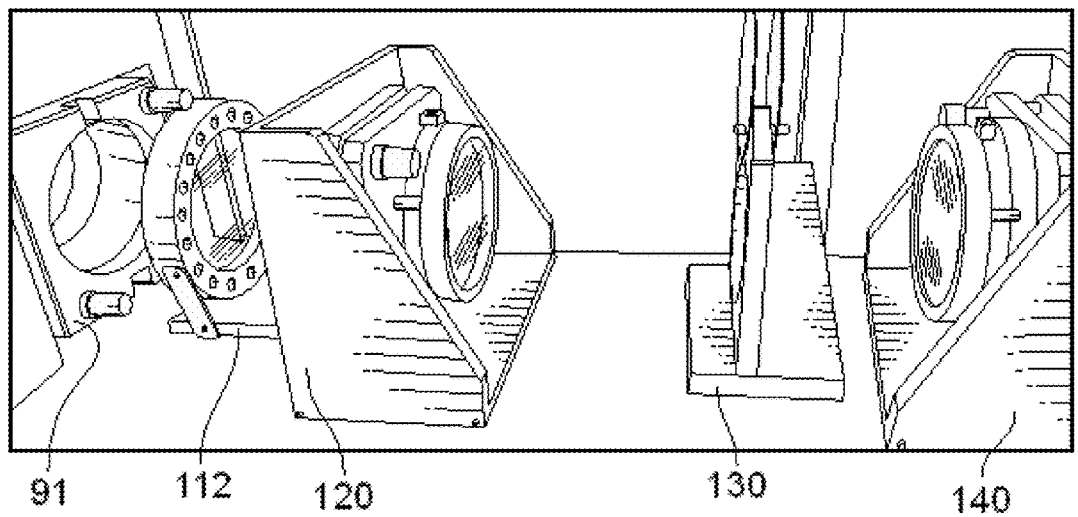
FIG. 6A is a photograph of the same setup in 4A but with a vacuum window inserted between the interferometer and the transmission flat.

In these interferometry measurements, the global order of image processing is roughly the same. FIGS. 4A, 5A, and 6A are single "snapshots" of the interferogram (or, intensity variations due to variation in path length) of the SUT and reference flat. This single snapshot can be used to determine the rough shape of the mirror but cannot effectively be used to build a full map with nm height resolution. In order to build a full surface profile map, interferometers take many snapshots of the interferogram while changing something in optical path. For the prior art spatially-shifted (or path-length shifted) versions (where only one wavelength is available) the instruments use a piezoelectric actuator to "step" the reference surface (flat or sphere) (or some other optic in the path) by a short distance, 10 nm per step perhaps, and do this hundreds of times while taking snapshots. Each interferogram snapshot then is of the same SUT/reference flat, but with a slight change in the path length each time. This causes the fringe pattern to "walk" around the optic, and the details in the data (for example, all the regions where there is a transition from black to white) from all the hundreds of snapshots are then used to collectively build a complete height map. To provide these many "snapshots", Fizeau interferometers typically utilize either a phase-shifting or a wavelength shifting. FIG. 3A is a cross-sectional illustration of mechanical tuning, via piezo controllers (PZT), of the phase for the interferometer for measurement of the SUT. An interferometer 90 interacts with a reference surface 120 (a reference flat in this instance) that is controlled by a spatial movement mechanism such as a PZT 50. The SUT 140 is positioned opposite the reference surface 120 from the interferometer 90. FIG. 3B is a cross-sectional illustration of wavelength tuned interferometer 90 for measurement of the SUT 140, but lacking a PZT 50. However, both the devices of 3A and 3B face the problems associated with the use of a vacuum chamber and the optical deflection by the vacuum chamber window.

Figure 4B:
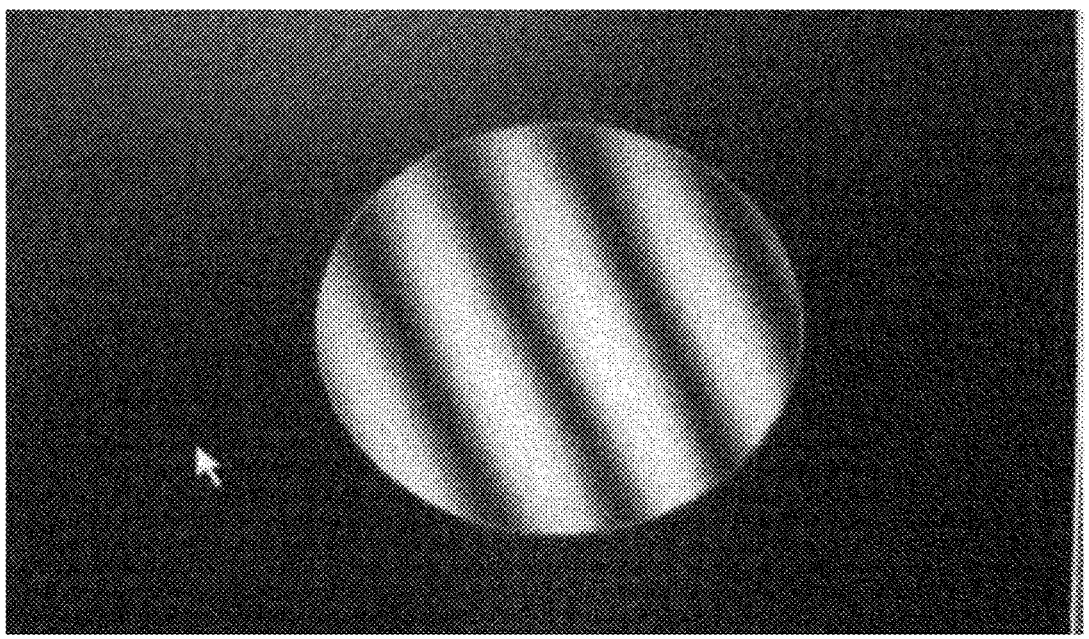
FIG. 4B illustrates an example interferogram of "generally" flat and aberration-free measurement from the setup in 4A.
Figure 5B:
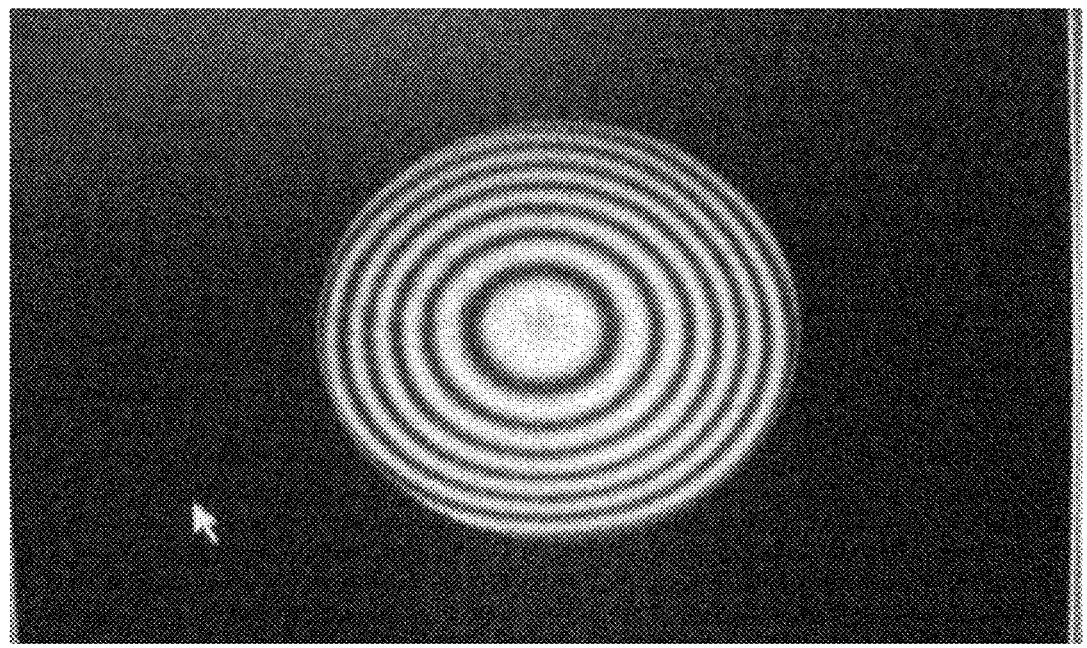
FIG. 5B shows the fringe pattern of the setup in FIG. 5A.
Figure 6B:
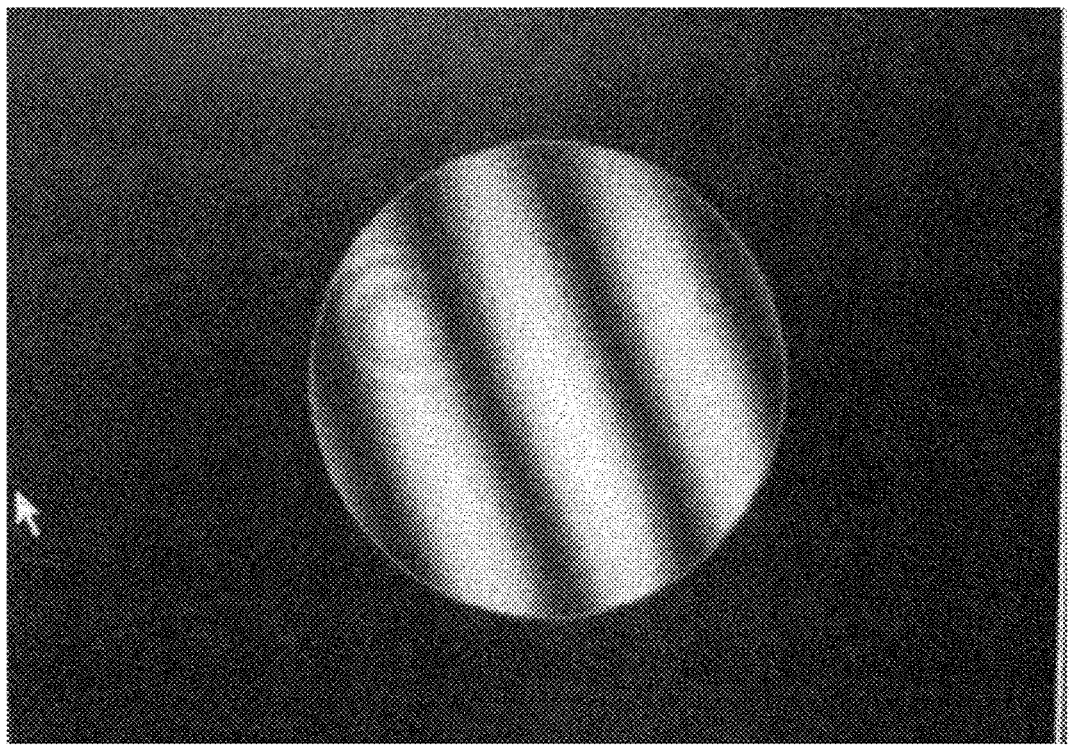
FIG. 6B shows the fringe pattern of the setup in FIG. 6A.

Simulations were performed to determine the impact that the placement of the vacuum window (an imperfect optical component under vacuum conditions) has on the interferometer results. FIG. 4A is a photograph of a setup with a interferometer 91, reference flat 120, and attenuator 130 between the reference flat 120 and SUT 140. FIG. 4B shows the fringe pattern of the setup in FIG. 4A. FIG. 5A is a photograph of a setup with a interferometer 91, reference flat 120, a curved mirror 112 (representing a vacuum chamber window 111) and attenuator 130 between the reference flat 120 and SUT 140. FIG. 5B shows the fringe pattern of the setup in FIG. 5A. FIG. 6A is a photograph of a setup with a interferometer, curved mirror 112 (representing a vacuum chamber window 111), reference flat 120, and attenuator 130 between the reference flat 120 and SUT 140. FIG. 6B shows the fringe pattern of the setup in FIG. 6A.

Figure 7A:
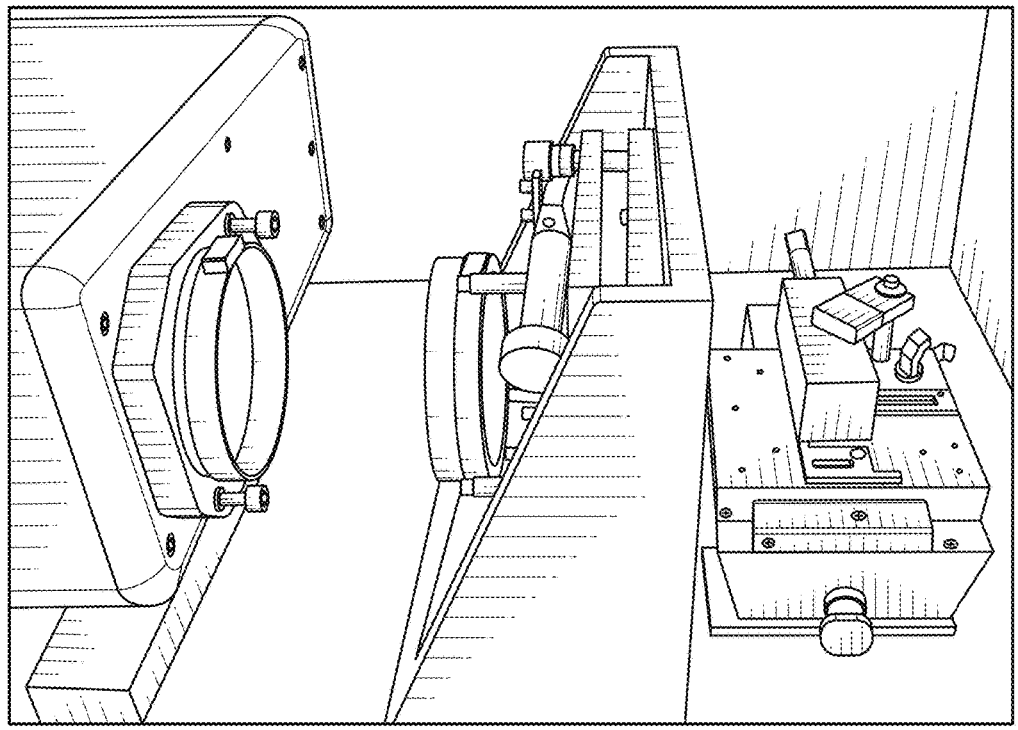
FIG. 7A is a photograph of a setup with a interferometer and a reference flat and SUT.
Figure 7B:
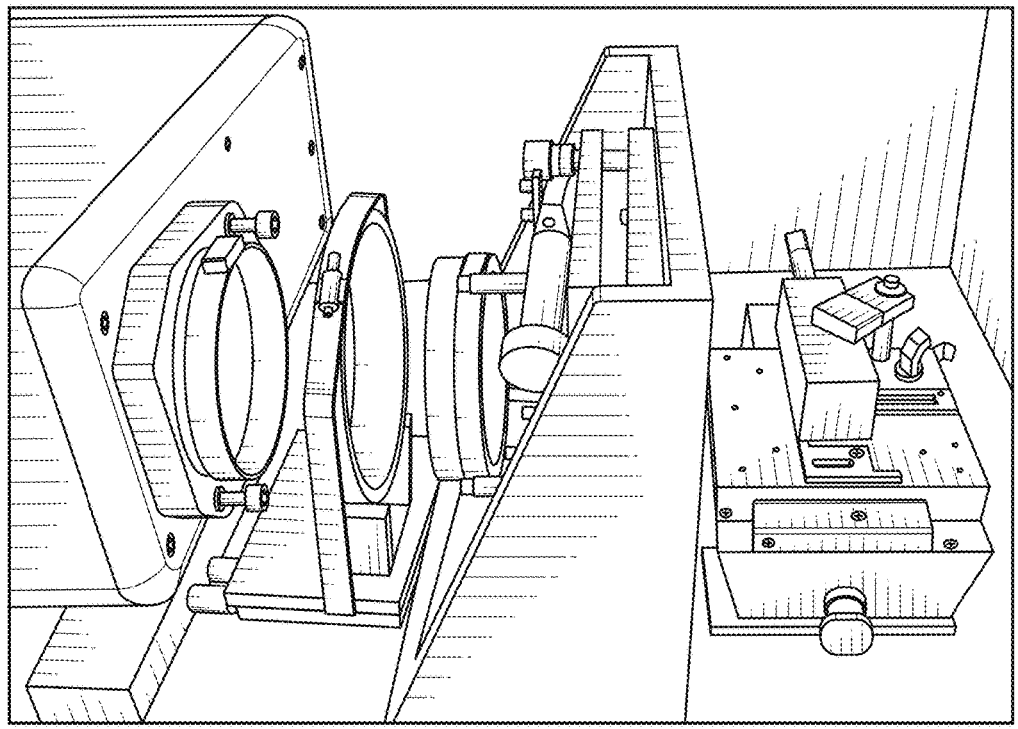
FIG. 7B is a photograph of a setup simulating a vacuum chamber window under vacuum, with a curved TF.
Figure 7C:
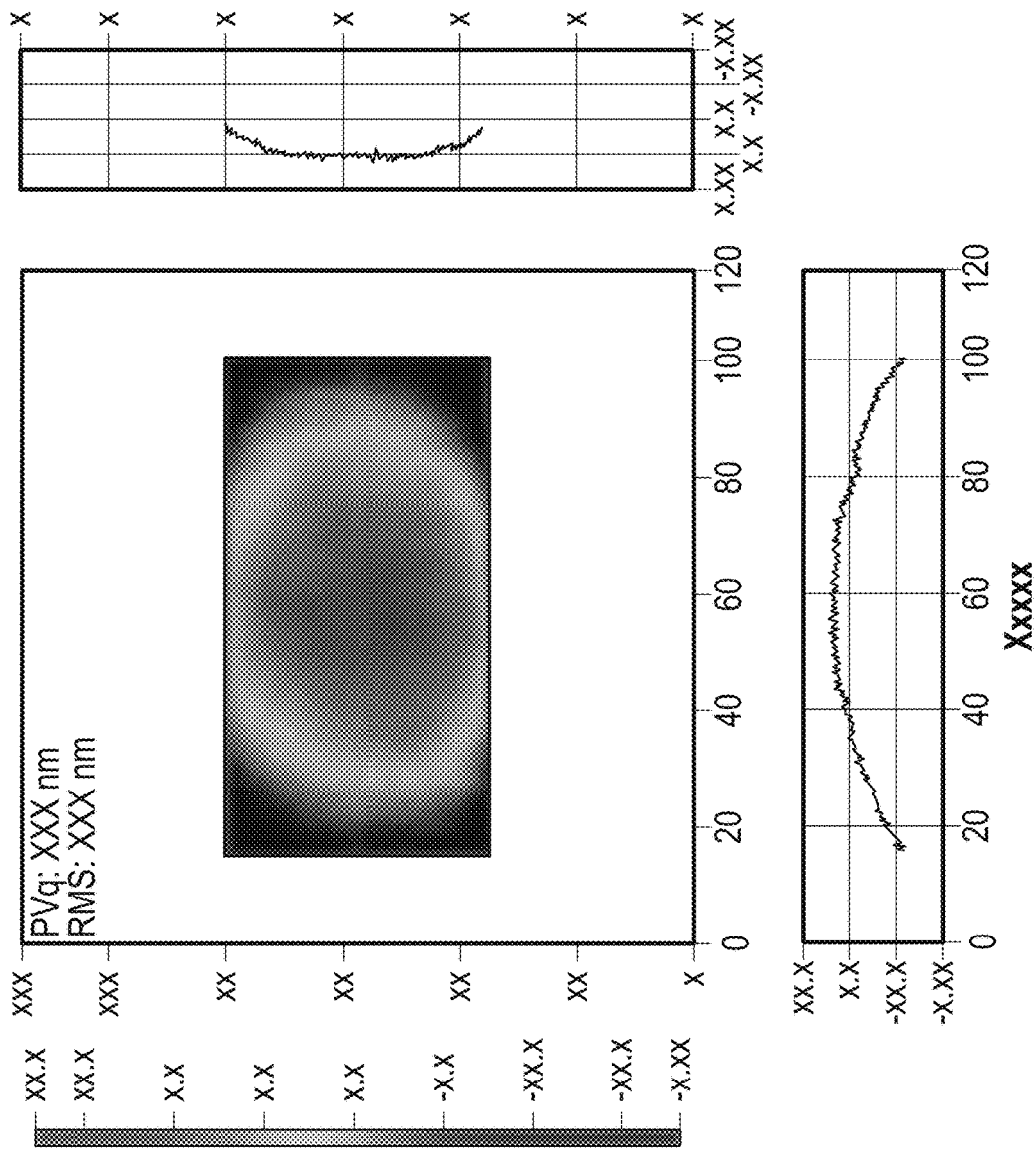
FIG. 7C is a graph illustrating the measurements for the setup of FIG. 7A.
Figure 7D:
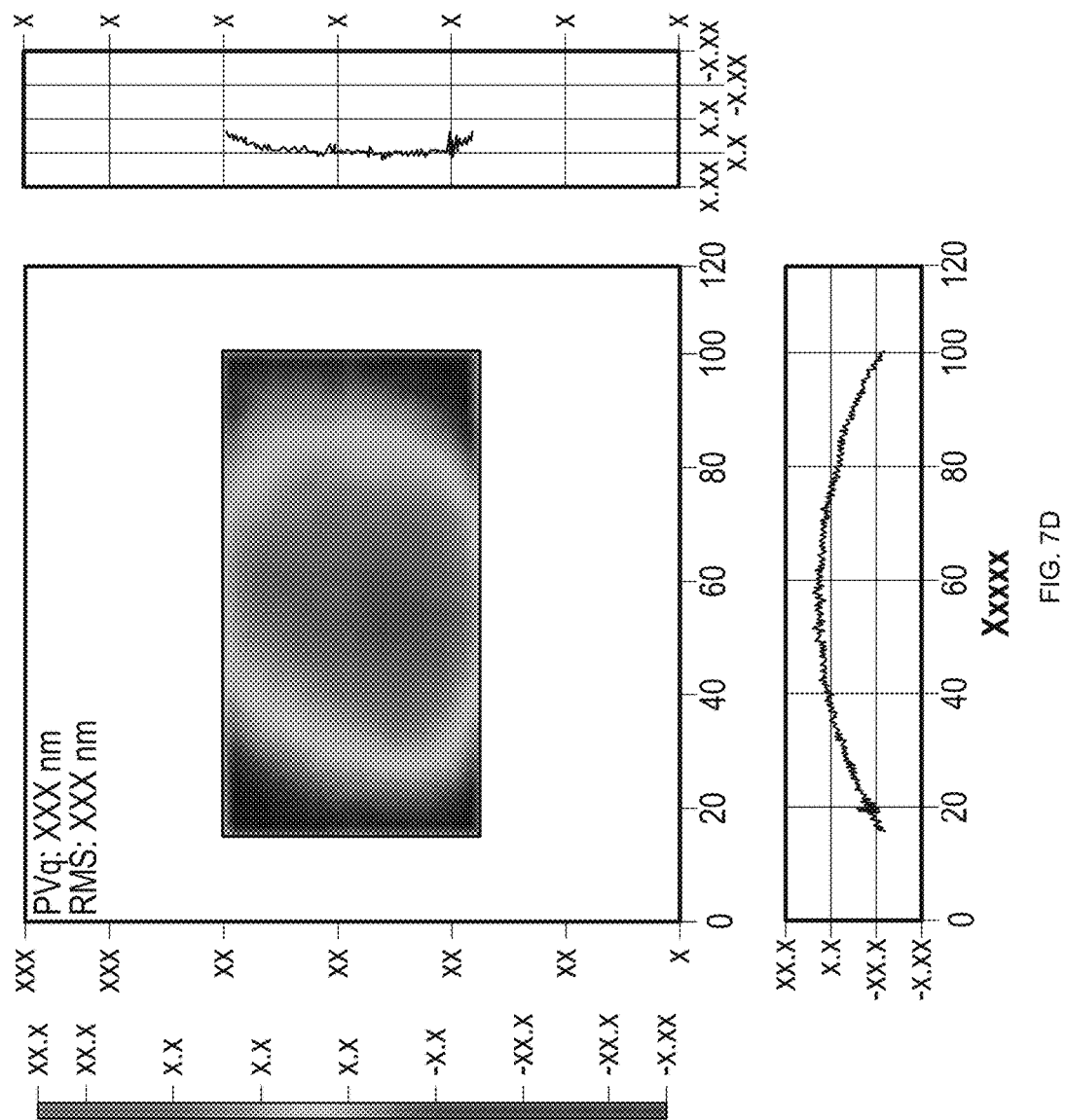
FIG. 7D is a graph illustrating the measurements for the setup of FIG. 7B.
Figure 7E:
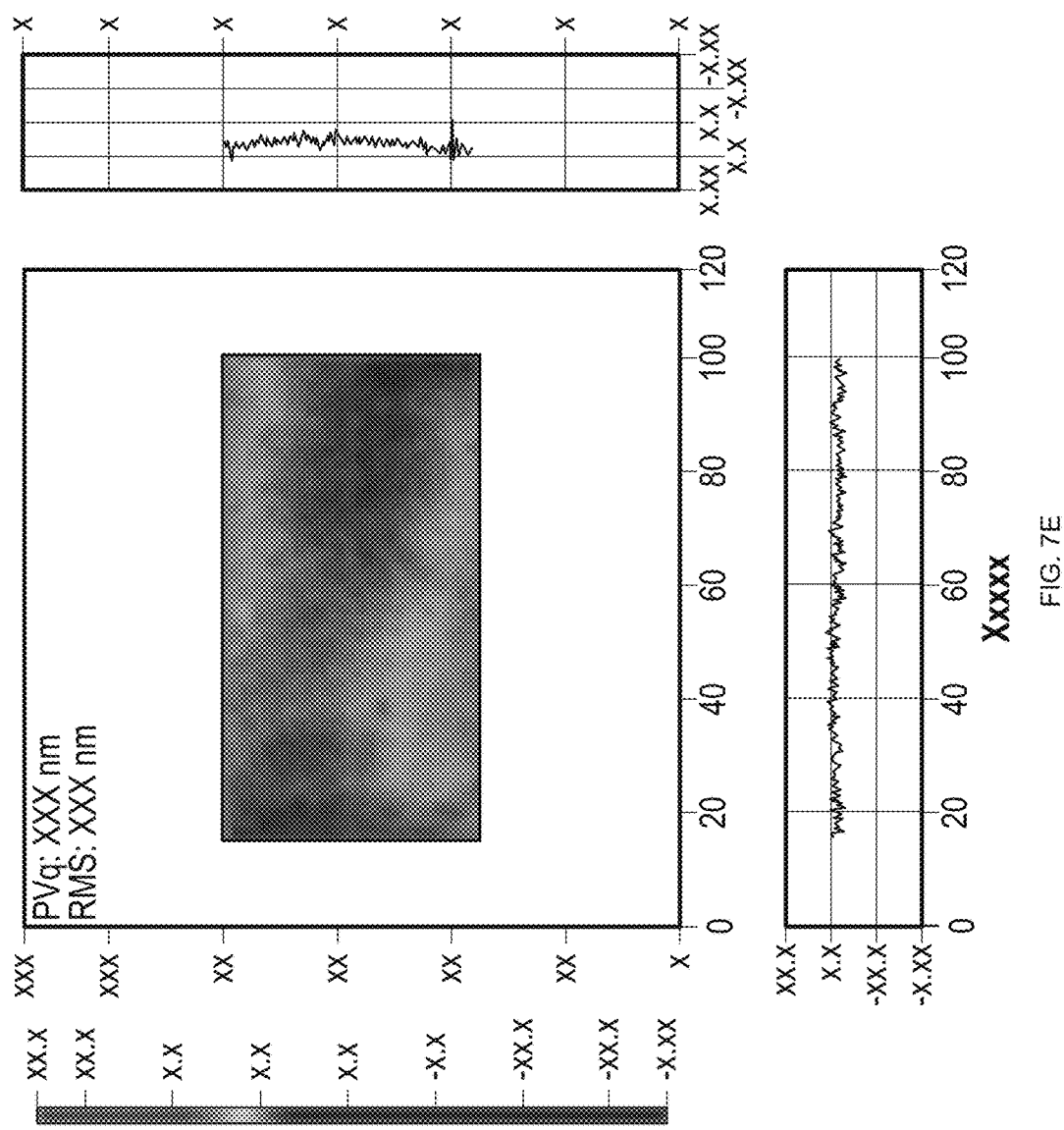
FIG. 7E is a graph illustrating the differences in measurements for FIGS. 7C and 7D.

The impact of the presence of the vacuum chamber window is further illustrated in FIGS. 7A-7E. FIG. 7A shows the setup of the measurement and the acquired surface figure of the Si substrate. FIG. 7B shows the setup of a second test measurement. The difference of the setup of FIG. 7B with FIG. 7A is that a curved TF was inserted between the collimator and the reference flat simulating as a VC window. The respective surface measurements are shown in FIGS. 7C and 7D. FIG. 7E shows the difference of the surface figures from the measurements of the A and B. It has RMS=1.58 nm and PV=8.06 nm. Thus, it can be seen that traditional Fizeau interferometers face substantial optical path deflections due to the vacuum chamber window, making such prior art systems unacceptable for in-situ applications such as fabrication schemes that utilize a vacuum chamber.

However, the problems presented by optical deflection can be overcome by embodiments described herein. In particular, the surface figure, i.e. that perturbation of the optical surface from ideal or "perfect", is of value in order to allow for compensation in the overall optical system can be determined in-situ without the need to remove the subject under testing, for example a mirror or other optical component, from the fabrication chamber. FIG. 7E shows minimal difference between the simulated SUT inside a vacuum and outside a vacuum. This can be contrasted with the setup of FIG. 5A and the resultant circular fringe pattern of FIG. 5B, which demonstrates an expected large impact (several microns) due to vacuum chamber window deflection in a typical setup with the reference flat positioned outside of the vacuum chamber. The prospect of obtaining surface figure information without the need to extract the substrate from the vacuum chamber provides a number of performance advantages. Such in-situ measurement capability would not only increase throughput for standard ion-beam figuring, but would also allow quasi-real time deposition feedback and more frequent monitoring of the IBF process to study its variability. Additionally, removing the requirement of venting the process chamber; thereby exposing the sample to atmosphere, would allow the flexibility to work with reactive materials.

Figure 8A:
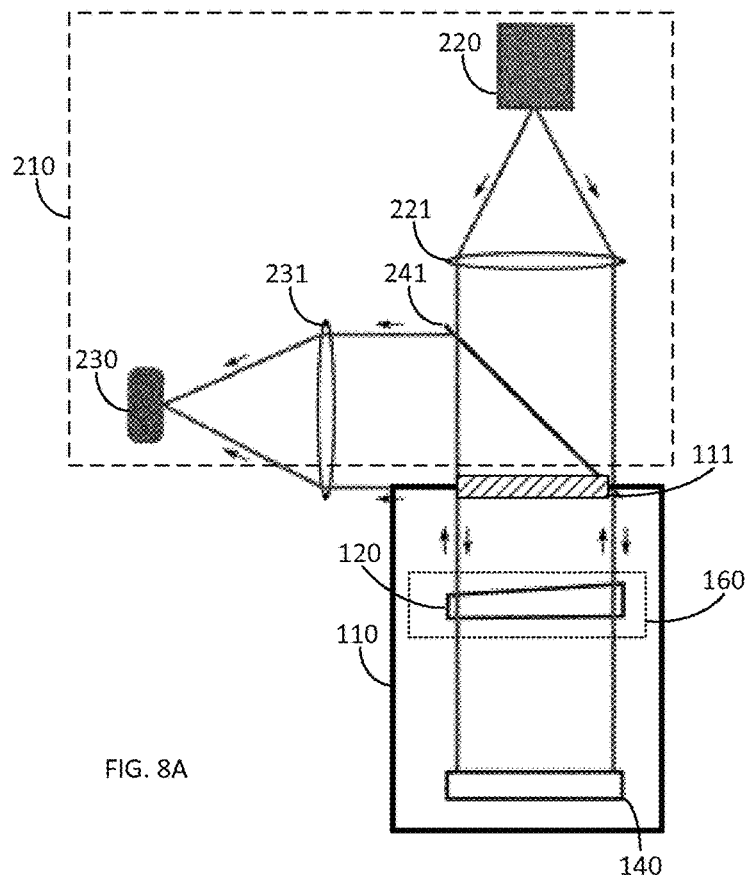
FIG. 8A is a schematic representation of a typical interferometry optical setup.
Figure 8B:
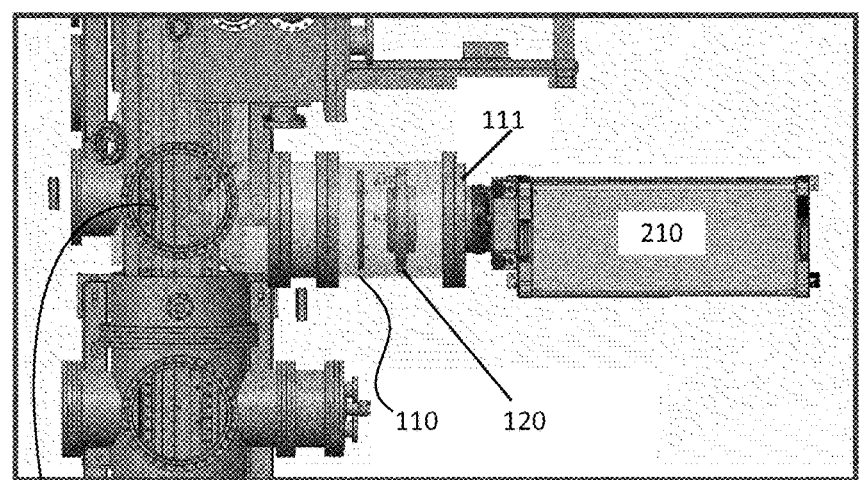
FIG. 8B illustrates a schematic view of a SUT translation station inside a vacuum-based mirror processing system, the gimbal system, a vacuum window, and an interferometer.

FIG. 8A illustrates a simplified structure of a mirror figure processing system 210 with an interferometer 90. The system 210 includes a interferometer 90 with a beam source 220 associated with a first optical element 221 such as a collimator. The system 210 also includes an imaging system 230, typically as part of the interferometer 90, including an associated second optical element 231. A third optical element 221 is provided in optical communication with the interferometer 90 and the vacuum chamber 110. The vacuum chamber 110 includes a vacuum chamber window 111 and a reference surface 120 disposed within the vacuum chamber 110. The reference surface 120 may be positioned within a gimbal system 160 and movable relative to the vacuum chamber 110 and, specifically, relative to the interferometer 90 and source 220. The reference surface 120, illustrated as a reference flat, is between the vacuum chamber window a test surface or subject under test (SUT) 140, which is the object of the measurement by the interferometer 90. FIG. 8A illustrates the SUT as within the vacuum chamber 110, but it may be positioned in optical communication with the vacuum chamber 110 but physically separated. While the presently described system and methods can be utilized generally in numerous optical applications, one embodiment relates to a new modular deposition system has been designed, constructed, and commissioned at the Advanced Photon Source that will be used for the fabrication of a wide array of thin-film based x-ray optics, including multilayer deposition and ion-beam figuring (IBF) of optics up to 1.5 meters long. Off-line surface metrology as described herein can be utilized for iterative feedback into the fabrication process. The mirror figure processing system FIG. 8B illustrates another partial view of a mirror figure processing system with a interferometer.

The tantalizing prospect of measuring surface figure in-situ is addressed by the system and methods described herein, specifically by use of a wavelength-shifting interferometer (WSI) for measurements in a vacuum chamber. The systems and methods allow for accurate measurement under vacuum. In-situ measurements would decrease processing time, allow almost real-time deposition feedback, and eliminate many environmental factors that introduce measurement errors such as atmospheric turbulence and humidity variation.

While Fizeau interferometers have been used, the traditional Fizeau interferometers use an off-axis geometry that leads to re-trace errors generating measurement errors. In contrast, one embodiment of the system uses on-axis geometry of a WSI with compensation mechanism for vacuum pressure to avoid aberrations in wavefront providing better interferometric measurements. An on-axis interferometer is used so that vacuum pressure on the first flat does not impose aberrations in the wavefront. Traditional Fizeau interferometers (such as those described in the Background) utilize an off-axis geometry and so re-trace errors would generate unavoidable measurement error with this technique. By utilizing an on-axis interferometer in place of a more conventional off-axis Fizeau mechanical phase-shifting interferometer, the interferometry reference flat can be remotely located within the UHV system.

This approach can not be used in a vacuum because of, among issues, the vibration in the system. Further, it would be difficult to reliably scan path length with the SUT/reference flat in an in-situ instrument because the stages for the mirror figuring machine (where the SUT is) and the interferometer reference flat are different. To overcome this, system and methods described herein provide an alternative. In some embodiments, instead of changing path length as has been traditionally done, only one optical path length is used but a property of the beam is changed, for example wavelength or phase while the. FIG. 8A shows a simplified embodiment of this setup. This configuration reduces certain measurement errors induced by environmental factors such as air turbulence and humidity. This system uses a spatial phase shifting technique which makes possible fast data acquisition that offers both vibration immunity and the ability for dynamic measurement. Wave-front distortion from the vacuum chamber window due to re-tracing errors inherent in the optical path of an off-axis interferometer are reduced (or eliminated) by the use of the on-axis geometry.

In general, systems and methods described for in-situ on-axis Fizeau interferometry provide several advantage:
  No humidity effects
  No air turbulence
  Keeps the mirror under vacuum
  Fast iteration rate
  Ability to avoid oxidation (metals, etc.)
  Extremely accurate registration between the measurement system and the processing system.
  The vacuum environment can allow for precursors for deposition such as, including but not limited to, CVD or ALD that would not be available if the substrate where not in a vacuum.

In one embodiment, the wavelength-shifting interferometer ("WSI") resides in atmospheric conditions, outside of the vacuum chamber ("VC"), and measures a mirror inside of the VC. With reference to FIG. 8A, the arrangement of the components for the in-situ on-axis Fizeau interferometry can be seen. The optical path deflection of the vacuum chamber widow under pressure is one of the main considerations which affect the accuracy of the mirror surface measurement, as noted above. However, by utilizing a wavelength shifting on-axis interferometer in place of a more conventional off-axis mechanically tuned Fizeau phase-shifting interferometer, the reference flat of the WSI can be located remotely inside the VC without the need for a mechanical phase shift tuning system. Wavefront distortion from the VC window due to re-tracing errors inherent in the optical path of an off-axis interferometer are reduced by the use of the on-axis geometry. The issues of prior art methods (meaning measurement under ambient conditions) are avoided by utilizing a first transmission flat as the vacuum window in order to eliminate refractive index variations within the optical path, and by then placing the real transmission flat as a reference flat remotely, in the vacuum system. This system uses a spatial phase shifting technique which makes possible fast data acquisition that offers both vibration immunity and the ability for dynamic measurement.

Figure 9A:
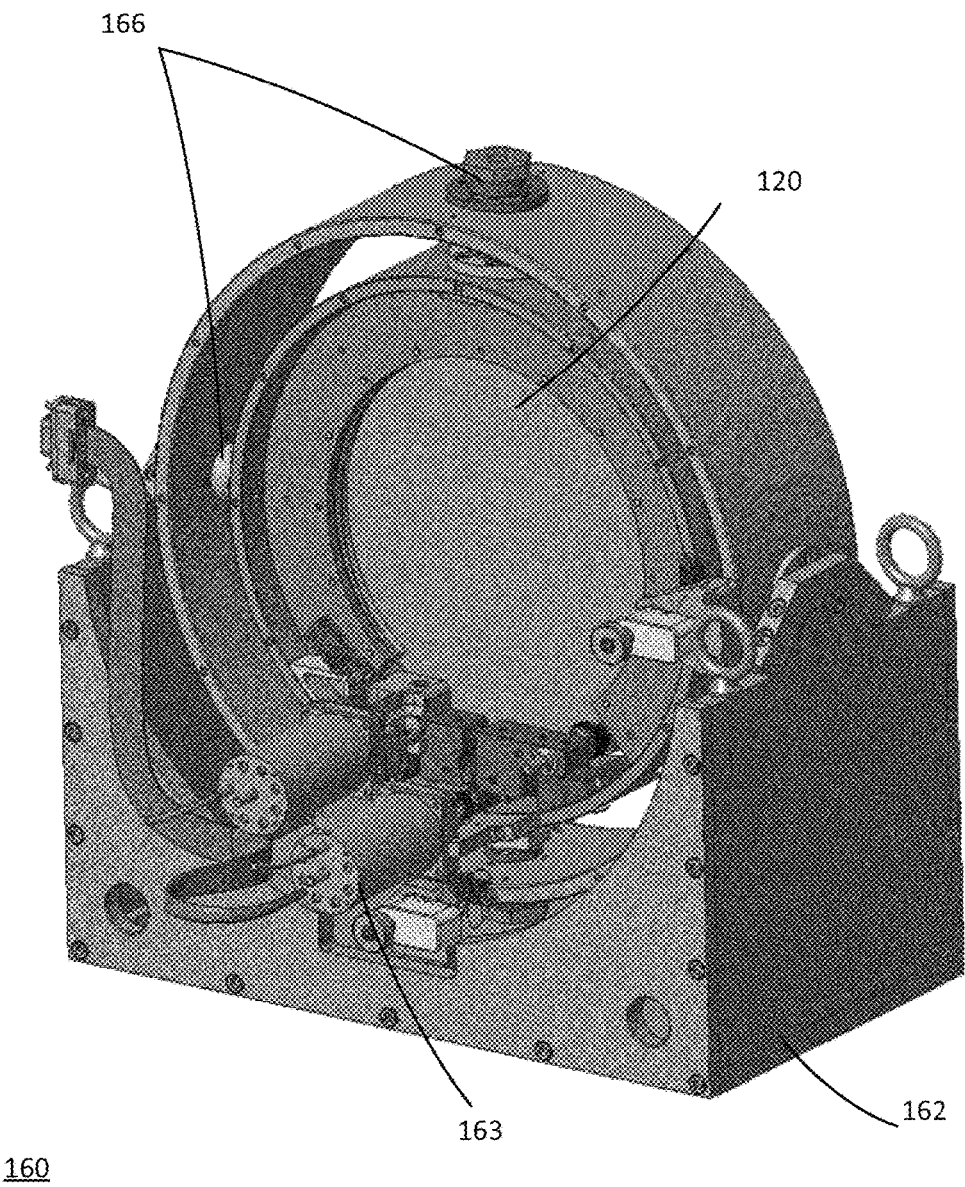
FIG. 9A is a vacuum compatible gimbal with rotational flexure hinges for tip/tilt alignment, and capability to rotate the SUT for reference surface error subtraction.
Figure 9B:
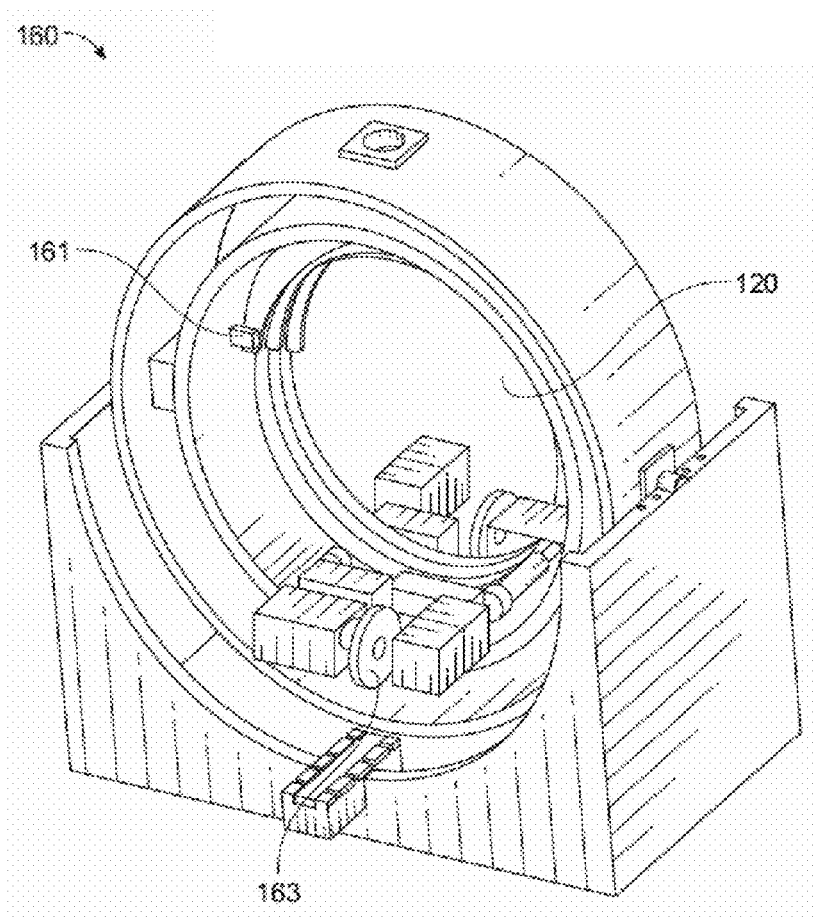
FIG. 9B illustrates one embodiment of a gimbal with the belt supporting the reference surface exposed.
Figure 9C:
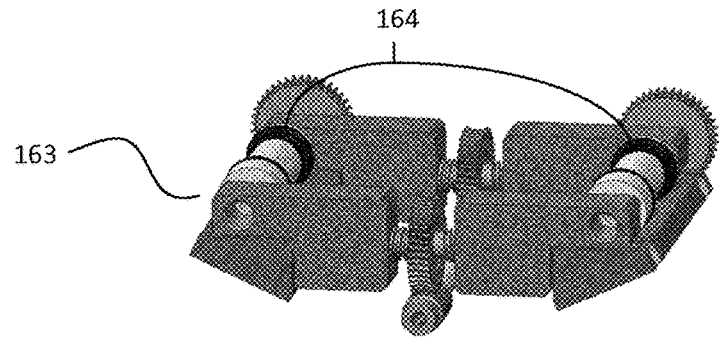
FIG. 9C is a perspective view of an embodiment of a wheel assembly for engaging and rotating the reference surface.

In one embodiment, best shown in FIG. 9A, the UHV gimbal system 160 provides a mounting and tilting system. In one embodiment, the gimbal system 160 includes a support belt/band 161 for stresslessly supporting/mounting, i.e. without altering the optical properties due to the supporting/mounting, the reference surface 120. A gimbal housing 162 supports the belt 161 and houses the electromechanical components including the gimbal movement assembly 163, such as gears and motors. In particular, one embodiment uses flexure hinges 166 for zero drag/friction for tilting the flat (relative to the surface under test). Pico-motors may be utilized to provide tip/tilt along with actuators, such as Renishaw encoders for position feedback. A tape encoder (again, for example, a Renishaw resolute) is wrapped around the outside of the glass and read with an encoder in order to determine angular position with sub-pixel accuracy. The gimbal 160 may also be utilized to rotate the reference flat 120 about an axis, for example for a three-flat test. The TF is lifted by two wheels 164, for example with a central recess for accommodating the belt 161 (e.g, having a thread spools shape). Once the reference flat 120 is lifted off the belt 161, one spool spins in order to rotate the TF. The spools then depart from each other, thus dropping the glass back on the belt. In one embodiment, the gimbal 160 is adapted to handle an oversized reference flat so there is room to aim an autocollimator at a portion of the optic so we can retrieve accurate angular position if required This UHV optical gimbal provides the requisite tip, tilt, and rotation in order to adjust the flat remotely while still accommodating the three-surface (or three-flat) test. The three-surface test is the most rigorous method to date for subtraction of optical path aberrations in an interferometry measurement. In one embodiment, roll is a required input for application of the three-flat test. For embodiments using a three-flat test, three measurements of the same optical surfaces are taken, while changing ONLY the roll (or rotation) of either the SUT or the reference flat. This can be accomplished without removing the optical surface from the vacuum chamber by engagement with the wheels 164 as described above. By changing the rotation of only one optic (and knowing what that rotation is so you can get back to it) a series of three measurements will reveal which features are embedded in the TF and which features come from the SUT. Although in one embodiment, pitch and yaw are not utilized, in another embodiment, they can be used when stitching multiple mirror segments together to reduce long-term figure error from sub-aperture measurements. The reference flat is captured "stress-free" about the horizontal optical axis. The reference flat is rotatable 360° (such as) 359° about optical axis for three-flat reference subtraction The gimbal system exhibits motion for gimbal yoke rotation: ±2.0 degrees, maximum from nominal; motor linear resolution: <0.5 nm.

In one embodiment, the gimbal system operates in UHV environment in a ~12" OD vacuum tubing. While a vacuum chamber has been described herein, in certain embodiments the vacuum chamber is under vacuum but in yet further embodiments the vacuum chamber is merely an isolated environment as an environmental control chamber with an associated window to allow for interferometry, such as for providing a particular pressure or chemical (for example inert gases) environment.

Figure 10A:
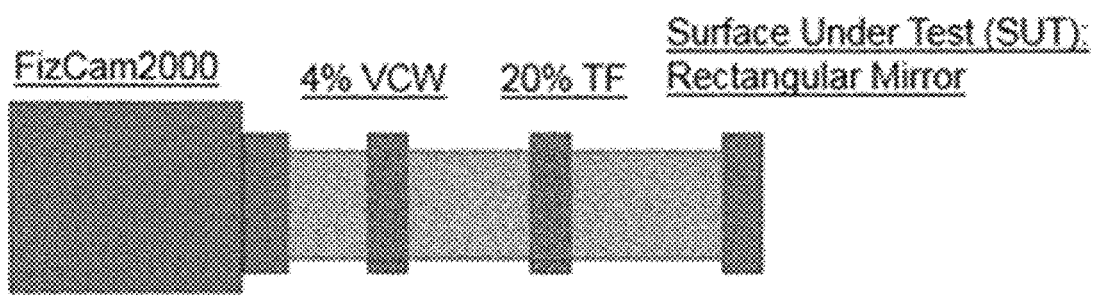
FIG. 10A shows an experimental setup with a non-tilted VCW.
Figure 10B:
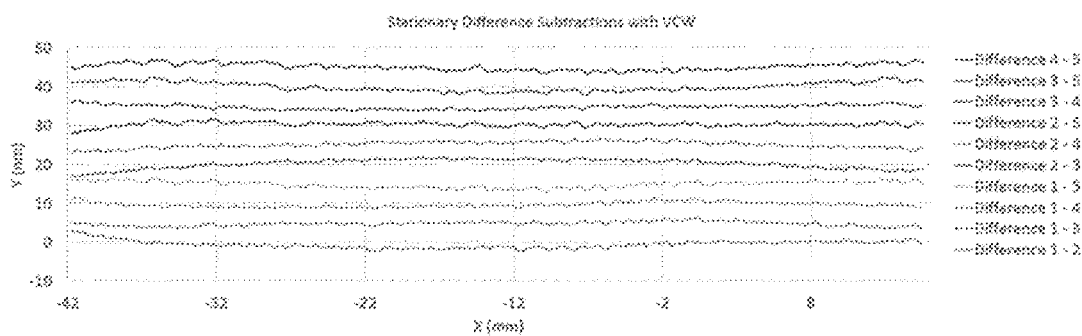
FIG. 10B shows the experimental data from the setup of FIG. 1 illustrating minimal variance associated with noise.
Figure 11A:
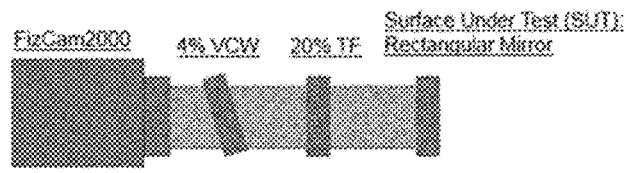
FIG. 11A shows an experimental setup with a tilted VCW.
Figure 11B:
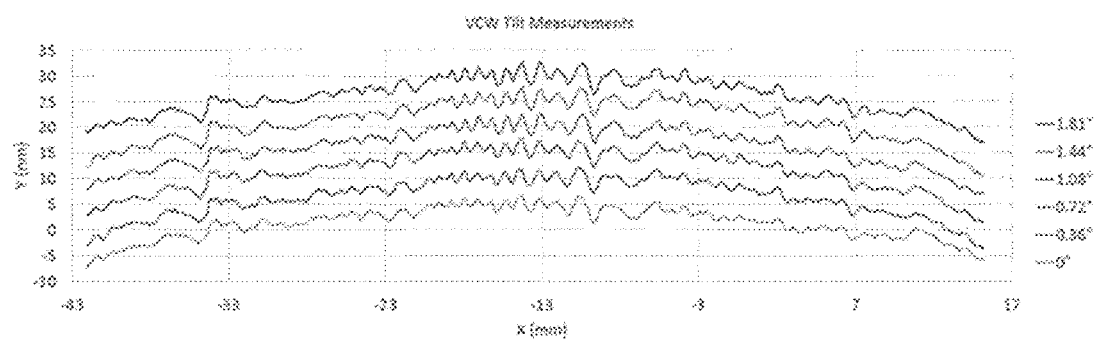
FIG. 11B shows line measurements at different angles of VCW tilt.
Figure 11C:
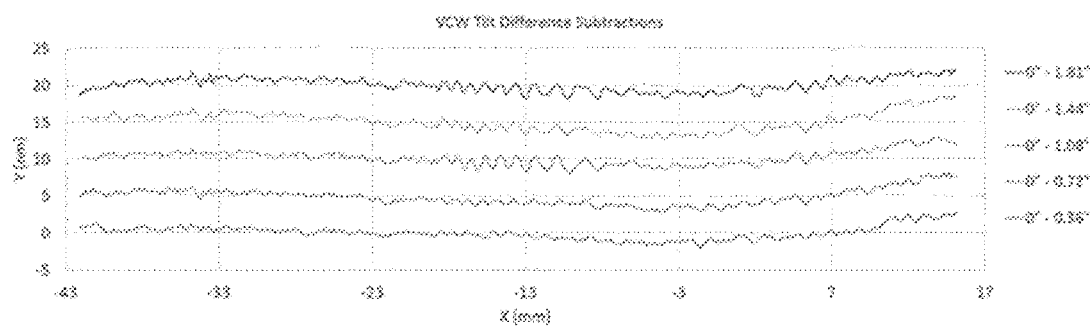
FIG. 11C show the subtraction measurements of each of these from the baseline zero degree measurement Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

The gimbal system 160 may further be utilized for position and control of the reference surface and/or the surface under testing within the environmental control chamber Experimental results have proven that in-situ metrology can work through the vacuum window. FIG. 10A shows an experimental setup with a stationary measurement for a setup with Fizcam 2000, 4% vacuum chamber window (VCW), 20% transmission flat (TF) and SUT rectangular mirror. FIG. 10B shows the results, with the variation due to environment and general noise. Similar results were observed for a similar setup without a VCW. FIG. 11A shows an experimental setup with a tilt measurement for a setup with Fizcam 2000, 4% VCW, 20% TF and SUT rectangular mirror, so identical to that of FIGS. 10A and 10B, but with the VCW tilt. FIGS. 11B and 11C shows the corresponding data for the setup of FIG. 11B As the data shows, no matter what angle tilt is used, the measurements are identical. This shows that the concept of measuring through a curved VCW affect the measurements only minimally, if at all. Through the use of a dynamic on-axis interferometer and performing metrology testing through both a simulated vacuum window/transmission flat and actual testing of the same under real vacuum, it has been shown that remote location of the 2-surface transmission flat cavity is an effective method for in-situ surface metrology.

TABLE 2A

The RMS values versus window tilt angle

| Tilt | RMS (nm) |
|---|---|
| 1.81° | 3.088 |
| 1.44° | 3.405 |
| 1.08° | 3.052 |
| 0.72° | 3.128 |
| 0.36° | 3.229 |
| 0° | 3.095 |

TABLE 2B

The RMS values versus difference of profiles

| Line Subtraction # | RMS (nm) |
|---|---|
| 0°-1.81° | 0.676 |
| 0°-1.44° | 0.888 |
| 0°-1.08° | 0.784 |
| 0°-0.72° | 0.808 |
| 0°-0.36° | 0.678 |

Negligible measurement difference with various tilt angles (all RMS are <1 nm)

The purpose of the on-axis PSI is for the surface figure measurement of the mirror located inside of a VC through the VC window without having wavefront distortion from the VC window. The way to measure proper surface figure is to set the reference flat inside of the VC and the VC window locates between the collimator and the reference flat.

In one embodiment, the reference flat can be set inside of the VC without the need for having a PZT tuning system. A spatial phase shifting technique is employed by the interferometry device which makes possible for fast data acquisition that offers both vibration immunity and the ability for dynamic measurement.

In one embodiment, the interferometer legs are removed and replaced with an optical kinematic mount. The interferometer then sits on a granite block, which can rotate +/−2 degrees in order to align the entire optical path parallel to a surface being measured (especially if the surface has significant curvature for stitching measurements) The arc actuation mechanism is a conventional recirculating ball guide by THK. Actuation may be by a linear motor with an absolute encoder.

One embodiment of the measurement method utilizes an interferometer that has a very fast frame rate, so vibration is not a primary concern. However, a granite sub-frame may be used to reduce vibration and may be required for other purposes not related to metrology.

In one embodiment, the vacuum TF/window is mounted against a double o-ring seal (which in provides differential pumping for better vacuum) along with an outer ring which is mated, again, with an o-ring. Atmospheric pressure uniformly deforms the TF. In one embodiment the TF is tilted by 5-10 degrees, preferably by about 7 degrees to minimize chances of getting a back reflection.

In one embodiment, if it is found that severe curvature in the SUT produces significant retrace errors in the data due to the curvature of the vacuum window, in order to eliminate barometric pressure fluctuations, the entire interferometer assembly can be housed in a simple box (plexiglass, aluminum, etc.) whereby pressure inside the box is monitored with an absolute capacitance manometer (CM), and a mass flow controller injects a controlled amount of inert gas (directed by feedback from the CM to maintain a slight overpressure inside the interferometer enclosure). This will provide a side-benefit of maintaining a constant humidity to reduce possible issues with hydrophilic coatings on the interferometer optics.

In another embodiment, for the same purpose as described above regarding barometric pressure, the interferometer can be placed inside a rough vacuum environment, such that the pressure differential on the vacuum window is effectively nonexistent, while still maintaining vacuum purity for the measurement surface.

As used herein, the singular forms "a", "an" and "the" include plural referents unless the context clearly dictates otherwise. Thus, for example, the term "a member" is intended to mean a single member or a combination of members, "a material" is intended to mean one or more materials, or a combination thereof.

As used herein, the terms "about" and "approximately" generally mean plus or minus 10% of the stated value. For example, about 0.5 would include 0.45 and 0.55, about 10 would include 9 to 11, about 1000 would include 900 to 1100.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An interferometer system comprising:
   a beam source configured for wavelength or phase shifting;
   a vacuum chamber in optical communication with the beam source;
   the vacuum chamber having a vacuum chamber window;
   a surface under testing positioned in the vacuum chamber;
   a reference surface positioned in the vacuum chamber between the vacuum chamber window and the surface under testing, the reference surface mounted in a gimbal system; and
   an imaging system in optical communication with the beam source.

2. The interferometer system of claim 1, wherein the gimbal system stresslessly supports the reference surface and the reference system is able to pitch, yaw, and roll.

3. The interferometer of claim 1, wherein the gimbal system stresslessly supports the reference surface with a belt.

4. The interferometer of claim 1, wherein the reference surface is tilted 5-10 degrees with respect to an optical axis.

5. The interferometer of claim 1, wherein the interferometer system further includes a barometric pressure housing wherein the interferometer is disposed therein and isolated from barometric pressure fluctuations of an external environment.

6. An surface measurement system comprising:
   a wavelength or phase shifting on-axis interferometer coupled to a vacuum chamber;
   the vacuum chamber having a vacuum chamber window separating the vacuum chamber from the interferometer; and
   a reference surface positioned in the vacuum chamber;
   a fabrication system having a surface under testing, the fabrication system coupled to the vacuum chamber and the reference surface positioned between the vacuum chamber window and the surface under testing.

7. The interferometer system of claim 6, further comprising a gimbal system disposed within the vacuum chamber system.

8. The interferometer system of claim 7, wherein the gimbal system stresslessly supports the reference surface and the reference system is able to pitch, yaw, and roll.

9. The interferometer of claim 7, wherein the gimbal system stresslessly supports the reference surface with a belt.

10. The interferometer of claim 6, wherein the reference surface is tilted 5-10 degrees with respect to an optical axis.

11. The interferometer of claim 6, wherein the interferometer system further includes a barometric pressure housing wherein the interferometer is disposed therein and isolated from barometric pressure fluctuations of an external environment.

12. The interferometer of claim 6, wherein the fabrication system is selected from the group consisting of chemical vapor deposition, atomic layer deposition, and beam figuring.

13. A method of surface figure measurement comprising:
   mounting a reference surface in a gimbal system within a vacuum chamber;
   positioning the reference surface between a surface under testing and a window of the vacuum chamber;
   performing on-axis Fizeau interferometry on a surface under testing located in the vacuum chamber.

14. The method of claim 13, comprising performing a fabrication process forming the surface under testing prior to performing the interferometry.

15. The method of claim 13, wherein the reference flat is adjusted by the gimbal system and a three-surface test is performed.

* * * * *